United States Patent
Bauer

(10) Patent No.: US 7,241,195 B2
(45) Date of Patent: Jul. 10, 2007

(54) GAME CALL STRIKER

(76) Inventor: John E. Bauer, 811 E. Iowa St., Evansville, Vanderburgh County, IN (US) 47711

( * ) Notice: Subject to any disclaimer, the term of this patent is extended or adjusted under 35 U.S.C. 154(b) by 224 days.

(21) Appl. No.: 11/066,401

(22) Filed: Feb. 25, 2005

(65) Prior Publication Data

US 2005/0191937 A1  Sep. 1, 2005

Related U.S. Application Data

(60) Provisional application No. 60/548,312, filed on Mar. 1, 2004.

(51) Int. Cl.
*A63H 5/00* (2006.01)
(52) U.S. Cl. .................. 446/208; 446/202; 446/204
(58) Field of Classification Search .............. 446/202, 446/203, 204, 206, 208, 209, 213, 216; 84/330
See application file for complete search history.

(56) References Cited

U.S. PATENT DOCUMENTS

| | | | | |
|---|---|---|---|---|
| 388,439 A | * | 8/1888 | Olney | ............... 84/330 |
| 500,433 A | * | 6/1893 | Schubert | ............... 84/330 |
| 603,555 A | * | 5/1898 | Davis | ............... 84/330 |
| 2,972,834 A | * | 2/1961 | Bacon | ............... 446/200 |
| 4,207,703 A | * | 6/1980 | Saso | ............... 446/205 |
| 4,953,868 A | * | 9/1990 | Thompson et al. | ............... 473/234 |
| 5,133,551 A | * | 7/1992 | Handy et al. | ............... 473/567 |
| 5,690,534 A | * | 11/1997 | Shea | ............... 446/205 |

* cited by examiner

*Primary Examiner*—Nini F. Legesse
(74) *Attorney, Agent, or Firm*—Gary K. Price, Esq.

(57) ABSTRACT

A game call striker for frictionally interacting with a prior art game call. The game call striker includes a striker member that outwardly extends from a body portion. The body portion comprising first and second sound chambers, the first sound chamber including an insert sized to frictionally receive a base end of the striker member. In particular, the base end is fixedly secured within the insert with adhesive means such as glue. The striker member extends from the insert, through the first sound chamber, and outwardly extends from the body portion without the outer surface of the striker member touching the side walls of the first sound chamber. As a result, it is as though the striker member is "floating" within the first sound chamber.

14 Claims, 2 Drawing Sheets

GAME CALL STRIKER

Claim CROSS REFERENCES TO RELATED APPLICATIONS

U.S. Provisional Application for Patent No. 60/548,312, filed Mar. 1, 2004, with title "Game Call Striker" which is hereby incorporated by reference. Applicant claims priority pursuant to 35 U.S.C. Par. 119(e)(i).

Statement as to rights to inventions made under federally sponsored research and development: Not Applicable

BACKGROUND OF THE INVENTION

1. Field of the Invention

The present invention relates generally to game calls useful by hunters, photographers and game-watchers and the like to reproduce yelps, cackles, purrs, clucks and so on, to attract wild turkeys. More particular, the present invention relates to a game call striker for frictionally interacting with a prior art game call.

2. Brief Description of Prior Art

Turkey call devices are used to produce mimic turkey calls in hopes of inducing a live bird to respond and approach the caller. Use of these devices is fairly an art form. Numerous devices are known and understood in the relevant art for use by hunters and others for producing game sounds. While there are many types of calls available, including mechanical and electronic, the most widely used is the so-called "friction" or "rubbing" calls in which a vibratory rub or striker element is rubbed on a soundboard.

As is known in the art, a "friction" or "rubbing" game call is generally a handheld device that typically includes a sounding plate having a frictional upper surface and a cup in which the friction plate is disposed. The friction plate is typically manufactured of a material such as slate, ceramic, or other materials. The cup is typically manufactured of a plastic or other material and often includes one or more sound chambers to amplify the sound produced by the friction plate when frictionally excited by a game call striker.

As is generally understood in the relevant art, a game call striker includes a striker element that outwardly extends from a block or member. The striker element is typically manufactured from one of a variety of materials such as various woods, metals, and other materials. The block or member is typically manufactured of any variety of materials such as wood and plastic, as well as other materials.

The device is used by holding the game call in one hand with the upper surface of the friction plate facing upward and with the game call striker held in the other hand. The game call striker is typically held by the striker element close to the exposed tip of the striker element, similarly to holding a writing instrument between the thumb and the first two fingers. The tip of the striker element is then frictionally rubbed across the upper surface of the friction plate in various fashions and in various directions to produce desired animal calls.

Much of the appeal of the call and striker type of game call as described above comes from the wide variety sounds the device can produce. For instance, a given game call striker can produce numerous types of sounds by varying the speed, direction, angle, and force with which the tip is frictionally slid across the upper surface of the game call.

The prior art teaches game calls of various types, but does not teach a turkey call with the structure of the instant invention capable of being constructed inexpensively, is easy and therefore not cumbersome to carry, and produces numerous type of game sounds. The present invention fulfills these needs and provides further related advantages as described in the following summary.

As will be seen from the subsequent description, the preferred embodiments of the present invention overcome the above problems and difficulties of the prior art.

SUMMARY OF THE INVENTION

The present invention is directed to a game call striker for frictionally interacting with a prior art game call. The game call striker of the present invention generally includes a body portion and a striker member that outwardly extends from the body portion. The body portion includes first and second sound chambers. The first sound chamber defines an insert sized to frictionally receive a base end of the striker member. In particular, the base end is fixedly secured within an insert of the body portion with adhesive means such as glue. Installed, the striker member extends from the insert, through the first sound chamber, and outwardly extends from the body portion.

In application, the user holds the prior art game call in one hand with the upper surface of a friction plate facing upward, and with the game call striker held in the other hand. The game call striker held by that portion of the striker member extending from the body portion, close to the exposed tip end of the striker member. The tip end of the striker member is then frictionally rubbed across the upper surface of the friction plate in various fashions and in various directions to produce desired animal calls.

DESCRIPTION OF THE PREFERRED EMBODIMENT

In accordance with the present invention, a game call striker for frictionally interacting with a prior art game call is disclosed. The game call striker is directed to an apparatus useful to reproduce various game sounds in order to attract wild turkeys. Specifically, it will be noted that the game call striker relates to a friction game call employing a "floating" striker element. In the broadest context, the game call striker of the present invention consists of components configured and correlated with respect to each other so as to attain the desired objective.

Figure 1:
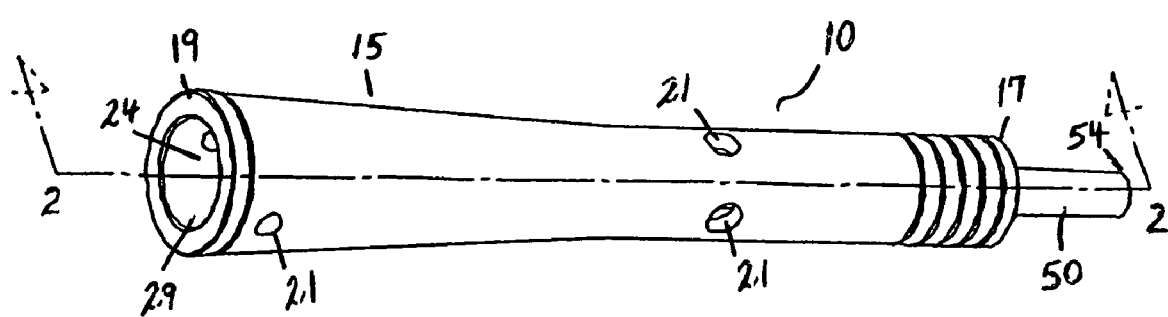
FIG. 1 is a perspective view of a preferred embodiment of the present invention, a game call striker.
Figure 2:
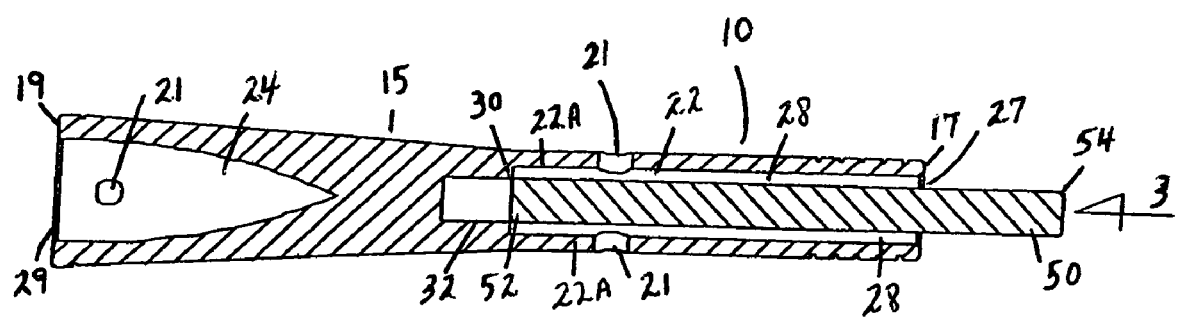
FIG. 2 is a side, sectional view of the game call striker of FIG. 1.
Figure 3:
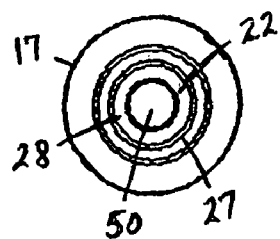
FIG. 3 is an end view of the game call striker of FIG. 1

FIGS. 1–3 illustrate a preferred embodiment of a game call striker 10 made in accordance with the present invention. The game call striker 10 generally comprises a body portion 15 and an elongated rod 50 that as will be further described, outwardly extends from a first end 17 of the body portion 15.

The body portion 15 is preferably a frusto-conic or cylindrical member made out of a stiff, lightweight material such as wood, although other materials such as plastic for example, may be used without departing from the spirit of the present invention. The body portion 15 includes a second end 19 opposite the first end 17. As illustrated, the second end 19 preferably having a larger diameter than the first end 17. The body portion 15 can further include a number of sound holes 21 selectively positioned along the body 15.

Sound holes 21 positioned adjacent the first end 17 of the body 15 pass through the outer surface of the body 15 in communication with a first sound chamber 22 (best shown in FIG. 2). The first sound chamber 22 is defined by side walls 22A and an insert 32 disposed within the approximate first end 17 of the body portion 15. In addition, the number of sound holes 21 can be positioned adjacent the second end 19 of the body 15. The sound holes 21 adjacent the second end 19 pass through the outer surface of the body 15, in communication with a second sound chamber 24 disposed within the second end 19 of the body portion 15.

As shown, the first and second ends 17, 19 defining opposite ends of the body portion 15. Each end 17, 19 include an end aperture 27, 29 respectively. The end aperture 27 being in communication with the first sound chamber 22, and the end aperture 29 being in communication with the second sound chamber 24.

The first sound chamber 22 has an elongated configuration and extends from the end aperture 27 to a location 30 at the approximate midway of the length of the body portion 15. The insert 32 is disposed at the location 30, the insert 32 sized to frictionally receive a base end 52 of the striker rod 50. In particular, the base end 52 is fixedly secured within the insert 32 with adhesive means such as glue. Installed, the striker rod 50 extends from the insert 32, through the first sound chamber 22, and outwardly extends from the end aperture 27 of the first end 17.

It is critical that the striker rod 50 extends from the insert 32 without the outer surface of the striker rod 50 touching the side walls 22A that define on the first sound chamber 22 so that the striker rod 50 appears to be "floating" within the sound chamber 22 as shown in FIGS. 2 and 3. As further illustrated, a distance 28 is defined between the outer surface of the striker rod 50 and the side walls 22A of the first sound chamber 22.

This "floating" feature as described eliminates restricting the striker rod 50 during use. Restricting the striker rod, such that the outer surface of the rod remains in contact with a surface of the striker's body portion for example, restricts vibration capabilities of the rod. Restricting vibration of the rod during use has a negative effect on the striker's tone quality. This "floating feature of the present invention avoids contact between the side walls 22A and rod 50, resulting in improved tone quality than the prior art strikers.

In the preferred embodiment, the striker rod 50 extends approximately one-half (½) inches from the end aperture 27 of the first end 17.

The striker rod 50 further includes a tip end 54 opposite the base end 52.

In application, and as known in the art, the user (not shown) holds the prior art game call (not shown) in one hand with the upper surface of a friction plate facing upward and with the game call striker 10 held in the other hand. The game call striker 10 is held by that portion of the striker rod 50 extending from the end aperture 27 of the first end 17, close to the exposed tip end 54 of the striker rod 50. The tip end 54 of the striker rod 50 is then frictionally rubbed across the upper surface of the friction plate in various fashions and in various directions to produce desired animal calls. The game call striker 10 is capable of reproducing a wide variety of game sounds by varying the speed, direction, angle, and force with which the tip end 54 of the striker rod 50 is frictionally slid across the upper surface of the prior art game call.

Although the description above contains many specificities, these should not be construed as limiting the scope of the invention but as merely providing illustrations of some of the presently preferred embodiments of this invention. As such, it is to be understood that the present invention is not limited to the embodiments described above, but encompasses any and all embodiments within the scope of the claims.

Thus the scope of the invention should be determined by the claims in the formal application and their legal equivalents, rather than by the examples given.

I claim:

1. A game call striker the game call striker comprising:
    a body portion, and
    an elongated striker member that outwardly extends from a first end of the body portion, said striker member having an outer surface,
    the body portion further comprising a second end opposite the first end, a first sound chamber disposed within the first end of the body portion, and a second sound chamber disposed within the second end, wherein said first sound chamber comprising side walls and an insert,
    said insert sized to frictionally receive a base end of the striker member so that the striker member extends from the insert, through the first sound chamber, and outwardly extends beyond the first end of the body portion such that said striker member can be held by said first striker member,
    wherein a distance is defined between the outer surface of the striker member and the sidewalls of the first sound chamber, and
    said striker member further includes a tip end opposite the base end such that sound can be generated by the vibration of the first striker member within the first sound chamber.

2. The game call striker as recited in claim 1, further including at least one sound hole selectively positioned along the body portion, said sound hole in communication with said first sound chamber.

3. The game call striker as recited in claim 1, further including at least one sound hole selectively positioned along the body portion, said sound hole in communication with said second sound chamber.

4. The game call striker as recited in claim 1, wherein the striker member appears to be floating within the first sound chamber of the body portion.

5. The game call striker as recited in claim 1, wherein said body portion further including a first end aperture and a second end aperture wherein said first end aperture is in communication with the first sound chamber, and said second end aperture is in communication with the second sound chamber and separated from said first sound chamber.

6. The game call striker as recited in claim 1, wherein the body portion having a frusto-conic configuration.

7. The game call striker as recited in claim 1, wherein the base end of the striker member is fixedly secured within the insert with adhesive means.

8. The game call striker as recited in claim 1, wherein the second end of the body portion having a larger diameter than the first end.

9. A game call striker the game call striker comprising:
    a cylindrical shaped body portion comprising inner side walls and an insert that define a first sound chamber, a second sound chamber, at least one first sound hole in communication with said first sound chamber, at least one second sound hole in communication with said second sound chamber, an elongated striker member comprising a tip end and a base end, wherein said insert sized to frictionally receive the base end of the striker member such that the striker member extends from the insert, through the first sound chamber, and outwardly extends from the body portion defining a distance between an outer surface of the striker member and the side walls of the first sound chamber such that said striker member can be held by said first striker member and sound can be generated by the vibration of the striker member within the first sound chamber.

10. The game call striker as recited in claim 9, wherein the first sound chamber is disposed within a first end of the body portion, and wherein the second sound chamber is disposed within a second end of the body portion and separated from said first sound chamber.

11. The game call striker as recited in claim 10, wherein the second end having a larger diameter than the first end.

12. The game call striker as recited in claim 9, wherein the striker member appears to be floating within the first sound chamber of the body portion.

13. A game call striker comprising:

a body portion comprising inner side walls and an insert that define a first sound chamber, and a second sound chamber;

an elongated striker rod comprising a tip end and a base end opposite the tip end;

wherein said insert sized to frictionally receive the base end of the striker rod;

wherein the striker rod extends through the first sound chamber defining a distance between the outer surface of the striker rod and the side walls of the first sound chamber; and wherein the striker rod outwardly extends from the body portion such that said game call can be held by said first striker rod and sound is generated by the vibration of the striker rod within the first sound chamber wherein said vibration is caused by frictionally rubbing said first striker rod.

14. The game call striker as recited in claim 13, wherein the striker rod appears to be floating within the first sound chamber of the body portion.

* * * * *